(12) United States Patent
Starkweather

(10) Patent No.: US 6,471,479 B2
(45) Date of Patent: Oct. 29, 2002

(54) TURBINE AIRFOIL WITH SINGLE AFT FLOWING THREE PASS SERPENTINE COOLING CIRCUIT

(75) Inventor: John Howard Starkweather, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/793,796

(22) Filed: Feb. 23, 2001

(65) Prior Publication Data

US 2002/0119047 A1 Aug. 29, 2002

(51) Int. Cl.⁷ ............................................. F01D 5/18
(52) U.S. Cl. ................................................ 416/97 R
(58) Field of Search ............................. 415/115, 116; 416/96 R, 97 R

(56) References Cited

U.S. PATENT DOCUMENTS

| | | | |
|---|---|---|---|
| 4,474,532 A | * 10/1984 | Pazder | 416/97 R |
| 5,387,086 A | 2/1995 | Frey et al. | |
| 5,403,157 A | * 4/1995 | Moore | 416/96 R |
| 5,603,606 A | * 2/1997 | Glezer et al. | 416/97 R |
| 5,669,759 A | * 9/1997 | Beabout | 416/97 R |
| 5,674,050 A | * 10/1997 | Hall et al. | 416/97 R |
| 5,813,836 A | 9/1998 | Starkweather | |
| 5,967,752 A | 10/1999 | Lee et al. | |
| 5,975,850 A | 11/1999 | Abuaf et al. | |
| 6,126,396 A | 10/2000 | Doughty et al. | |
| 6,132,169 A | 10/2000 | Manning et al. | |
| 6,168,381 B1 | 1/2001 | Reddy | |

* cited by examiner

Primary Examiner—Edward K. Look
Assistant Examiner—Ninh Nguyen
(74) Attorney, Agent, or Firm—William Scott Andes; Steven J. Rosen

(57) ABSTRACT

A gas turbine engine hollow airfoil includes an airfoil outer wall having width wise spaced apart pressure and suction side walls joined together at chordally spaced apart leading and trailing edges of the airfoil and extending radially outward from a base to a tip. The airfoil includes a single three pass aft flowing serpentine cooling circuit and a straight through leading edge cooling channel extending radially through the airfoil and bounded in part by the leading edge. The exemplary embodiment includes a trailing edge cooling plenum and a straight through single pass trailing edge feed channel for providing cooling air to the trailing edge cooling plenum.

26 Claims, 3 Drawing Sheets

TURBINE AIRFOIL WITH SINGLE AFT FLOWING THREE PASS SERPENTINE COOLING CIRCUIT

BACKGROUND OF THE INVENTION

1. Field of the Invention

The present invention relates generally to cooling air circuits of turbine rotor blades and stator vanes in gas turbine engines and, more specifically, to multiple pass serpentine cooling circuits within airfoils of the blades and vanes.

2. Discussion of the Background Art

A gas turbine engine includes a compressor that compresses air which is channeled to a combustor wherein it is mixed with fuel and ignited for generating combustion gases. The combustion gases flow downstream through one or more stages of turbines which extract energy therefrom for powering the compressor and producing additional output power for driving a fan for powering an aircraft in flight for example. A turbine stage includes a row of turbine rotor blades secured to the outer perimeter of a rotor disk with a stationary turbine nozzle having a plurality of stator vanes disposed upstream therefrom. The combustion gases flow between the stator vanes and between the turbine blades for extracting energy to rotate the rotor disk. The temperatures within gas turbines may exceed 2500 degrees Fahrenheit and cooling of turbine blades is very important in terms of blade longevity. Without cooling, turbine blades would rapidly deteriorate. Improved cooling for turbine blades is very desirable and much effort has been devoted by those skilled in the blade cooling arts to devise improved geometries for the internal cavities within turbine blades in order to enhance cooling. Since the combustion gases are hot, the turbine vanes and blades are typically cooled with a portion of compressor air bled from the compressor for this purpose. Diverting any portion of the compressor air from use in the combustor necessarily decreases the overall efficiency of the engine. Accordingly, it is desired to cool the vanes and blades with as little compressor bleed air as possible.

Typical turbine vanes and blades include an airfoil over which the combustion gases flow. The airfoil typically includes one or more serpentine cooling passages therein through which the compressor bleed air is channeled for cooling the airfoil. The airfoil may include various turbulators therein for enhancing cooling effectiveness and the cooling air is discharged from the passages through various film cooling holes disposed around the outer surface of the airfoil. In pursuit of higher cooling effectiveness, modern blades have led to multi-pass cooling circuits with many cavities such as 5 passes and 5 cavities. A drawback to having more cavities is that more ribs are required which result in more weight. At some combinations of scale and rotational speed, the heavier blade designs result in heavy rotor disks which are difficult to design for long life. Also, the use of a multi-pass serpentine requires extra coolant supply pressure. If the required coolant supply pressure can be reduced, then cooler air from an earlier compressor stage can be used. This benefits cycle performance since less work is put into the coolant.

Known turbine airfoil cooling techniques include the use of internal cavities forming a serpentine cooling circuit. Particularly, serpentine passages, leading edge impingement bridges, film holes, pin fins, and trailing edge holes or pressure side bleed slots are utilized for blade cooling. It would be desirable to provide improved blade cooling. In providing even better blade cooling, it also would be desirable to avoid significantly increasing the blade fabrication costs.

SUMMARY OF THE INVENTION

A gas turbine engine hollow airfoil with an airfoil outer wall having transversely spaced apart pressure and suction side walls joined together at chordally spaced apart leading and trailing edges of the airfoil and extending radially from a base to a tip. Inside the airfoil is a plurality of radially extending internal ribs extending width wise between the pressure and suction side walls and a single internal aft flowing three pass serpentine cooling circuit having radially extending first, second, and third serpentine channels between, in axially aft succession, first, second, third, and fourth ribs of the radially extending internal ribs. The serpentine cooling circuit has terminal end that is positioned aft of the entrance so as to have a chordal flow direction aftward from the leading edge to the trailing edge within the serpentine circuit. A straight through leading edge feed channel extends radially through the airfoil and bounded in part by the leading edge. The exemplary embodiment includes a trailing edge cooling plenum and a straight through single pass trailing edge feed channel for providing cooling air to the trailing edge cooling plenum. The airfoil is on a turbine blade in the exemplary embodiment of the invention illustrated herein.

The present invention provides advantages that include a good cooling of a hollow gas turbine airfoil using less cooling air than would otherwise be necessary while still providing sufficient cooling for the airfoil tip and acceptable airfoil tip metal temperatures. The cooling air in the mid-circuit can be tailored for the pressure side wall heat load, thus, allowing cooler temperatures at the tip of the last up-pass and better tip cooling. The downstreamwise serpentine circuit design of the present invention provides the coldest cooling air in the hottest areas of the blade. The cooling air temperatures are colder than the cooling air temperatures in the same channels and chambers in conventional upstreamwise serpentine circuit designs. The downstreamwise serpentine circuit will have a colder average spanwise rib wall temperature than that of an upstreamwise serpentine circuit and, therefore, have an overall better cooling air temperature distribution in the chordwise direction and a better bulk temperature of the airfoil for better cooling of the entire airfoil.

The leading edge is cooled by colder fresher cooling air than in those in the prior art reducing or eliminating the amount of film cooling required in this region and the straight through single pass channel used to cool the leading edge reduces pressure losses associated with impingement leading edge cooling chambers. In addition, the film cooling holes closer to the trailing edge can have shallower flow angles from surface than those closer to the leading edge resulting in a better film cooling effectiveness. The external gas flow velocity closer to the trailing edge accelerates to a higher speed than at portions along the airfoil side walls closer to the leading edge. Therefore, the airfoil cooling can be better tailored for conductive and convective cooling of portions of the sides of the outer wall closer to the leading edge and film cooling holes may be used for portions of the sides closer to the trailing edge where they will have smaller and, therefore, better blowing ratios and result in a better film cooling effectiveness and overall cooling efficiency.

Other advantages include increased coolant side heat transfer coefficient and improved metering capability for external film flow. The improved cooling also provides for cooler air to be discharged through the tip cooling holes providing improved cooling for the squealer tip.

Generally, design requirements for airfoils at the lower spans are driven by concerns for rupture at high stress levels at reduced metal temperature and at the upper regions by concerns over elevated surface temperature to avoid oxidation and fatigue crack initiation. The downstream flowing serpentine flow channels of the present invention addresses these needs along with the ability to better optimize internal airfoil cooling flow and blade life.

The cooling circuit configuration of the present invention allows the use of a lower coolant supply pressure. The three pass serpentine is also less vulnerable to variations in pressure drops from cast features than the circuits having more channels and passes. Dedicated circuits or channels for leading edge and trailing edge cooling provide better internal cooling at the edges where the external heat load is highest. The straight through separate leading edge channel helps the blade be tolerant of holes from foreign object damage. The impingement cavity at the trailing edge allows good support of the aftmost cavity core during the casting process. This cavity tends to be thin where the airfoil shape is tapering toward the trailing edge.

The present invention is capable of providing good cooling of the hollow gas turbine airfoil using less cooling air than would otherwise be necessary while providing an even distribution of temperatures for reduced thermal stresses. The aft flowing serpentine cooling circuit provides convective cooling in the region where the leading edge circuit can provide film coverage. The last pass of the serpentine then feeds film holes to cover the region where the trailing edge circuit provides convection. By allowing the film to exit at the aftmost part of the serpentine, the invention improves the film cooling benefit at the trailing edge where convection cooling is difficult.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
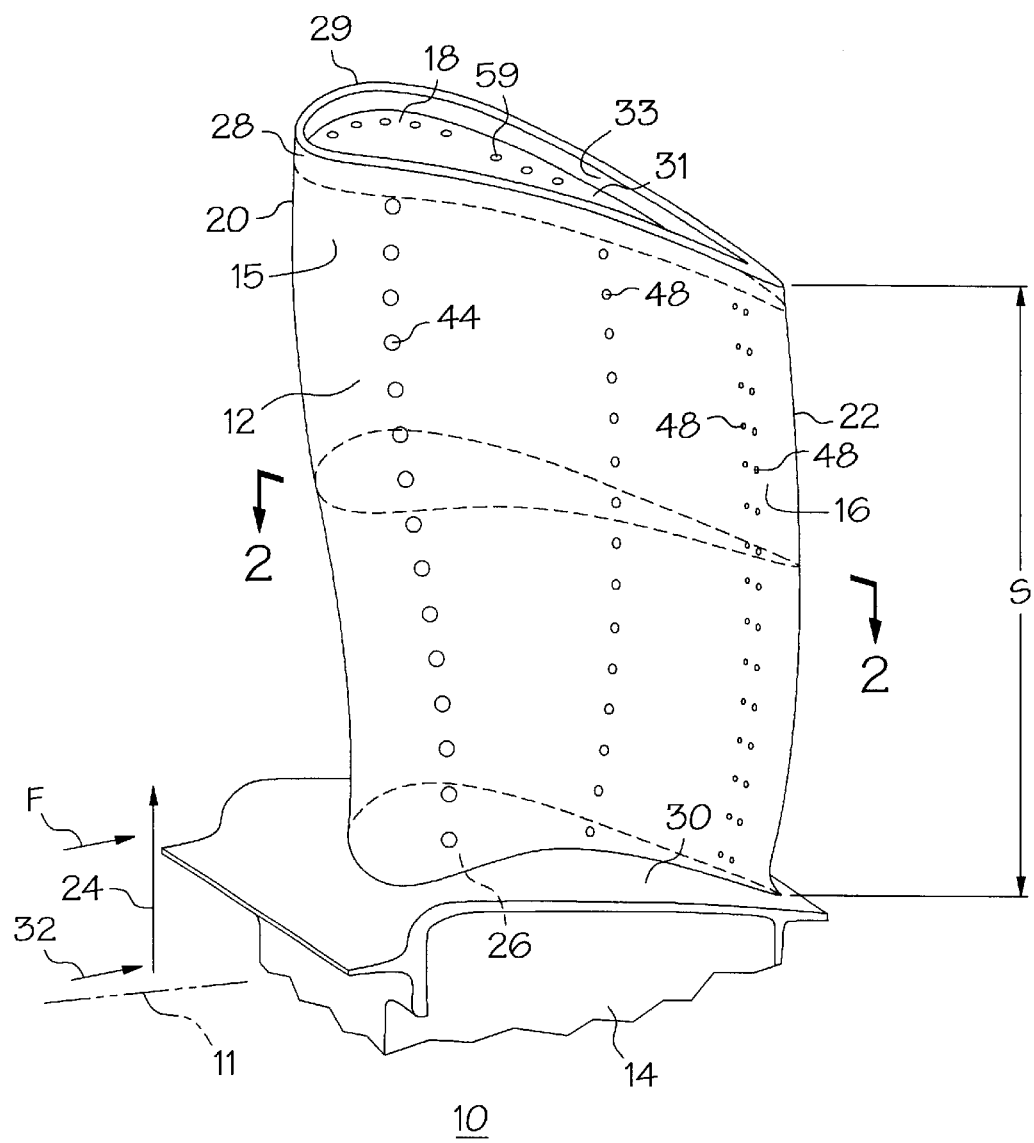
FIG. 1 is a perspective view of a gas turbine engine turbine rotor blade which incorporates the airfoil of the invention.

Illustrated in FIG. 1 is an exemplary turbine blade 10 for a gas turbine engine designed to be operated in a hot gas stream that flows in an axial flow downstream direction F. The blade 10 includes a hollow airfoil 12 extending radially outwardly from a root 14. The root 14 is used to secure the blade 10 to a rotor disk (not shown) of the engine which is circumscribed about an engine centerline 11. As further illustrated in a cross-section of the airfoil 12 in FIG. 2, the airfoil 12 includes an outer wall 15 width wise or transversely spaced apart pressure and suction side walls 16 and 18, respectively, joined together along an upstream leading edge 20 and a downstream trailing edge 22 which is spaced chordally apart from the leading edge. The airfoil 12 extends radially in a radial direction 24 away from the engine centerline 11 in a spanwise direction of the airfoil 12 from a radially inner base 26 to a radially outer airfoil tip 28 along a span S of the airfoil.

The airfoil tip 28 is illustrated as a squealer tip having an outward extension from the outer wall 15 or a squealer wall 29 extending radially outward from and peripherally around an outer tip wall 31 forming a squealer tip cavity 33 therein. Tip cooling holes 59 extending through the outer tip wall 31 from within the hollow airfoil 12 to the squealer tip cavity 33 are used to cool the tip cavity. The inner base 26 is defined at a conventional platform 30 which forms the inner flow boundary of the blade 10 and below which extends the root 14. During operation of the blade 10, combustion gases 32 are generated by a combustor (not shown) and flow downstream over both airfoil pressure and suction side walls 16 and 18, respectively, of the outer wall 15.

The exemplary embodiment of the present invention illustrated herein is designed to effect at cooling air efficient preferential chordwise and radial or spanwise cooling of the airfoil 12 to better match the distribution of the heat load thereto from the combustion gases 32. The gas turbine blade 10 illustrated in FIGS. 1–4 is exemplary and the invention applies equally as well to turbine stator vanes having similar airfoils which may be similarly cooled.

Figure 2:
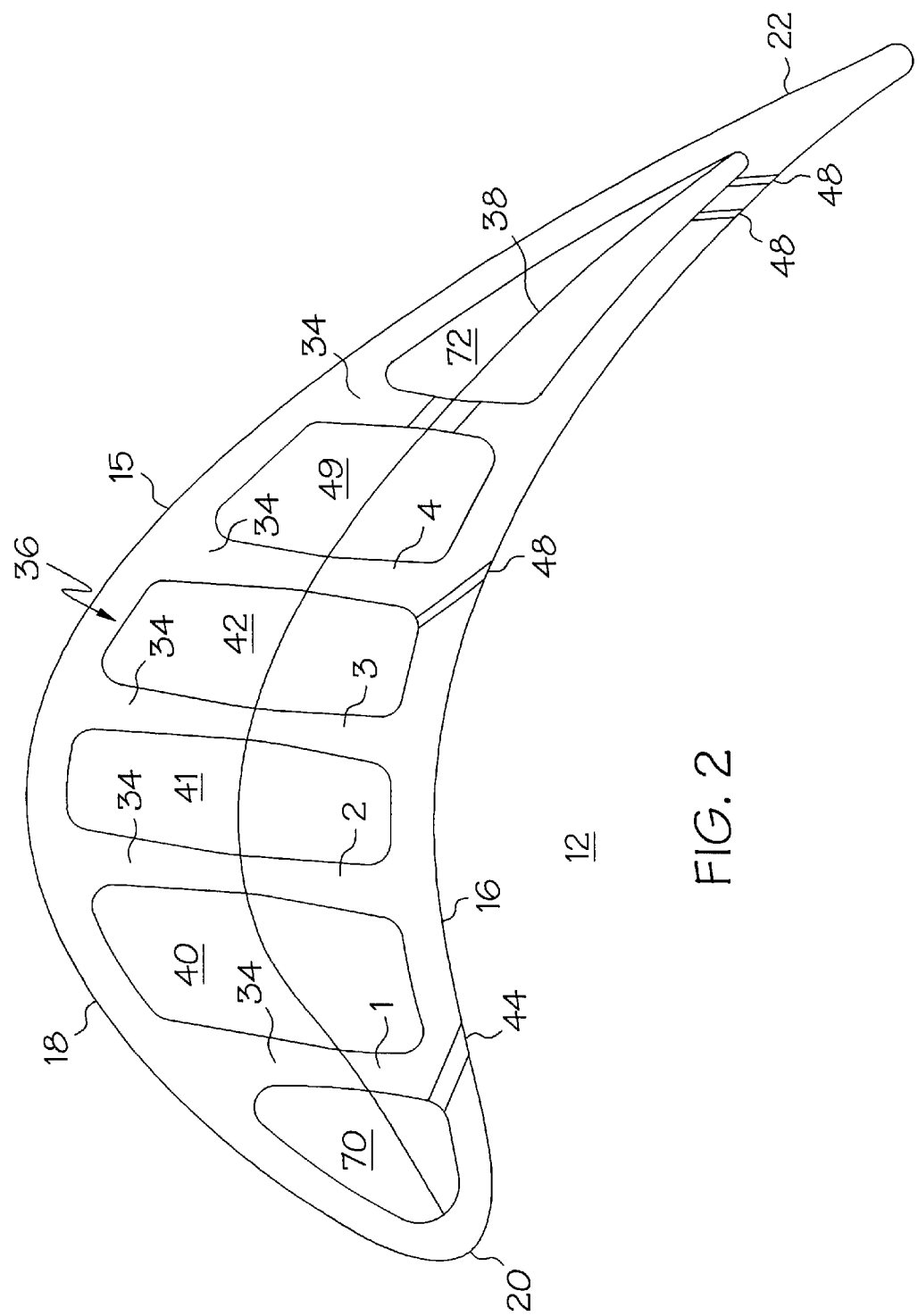
FIG. 2 is a sectional schematic illustration of an airfoil mid-span cross-section through line 2—2 of the airfoil in FIG. 1.
Figure 3:
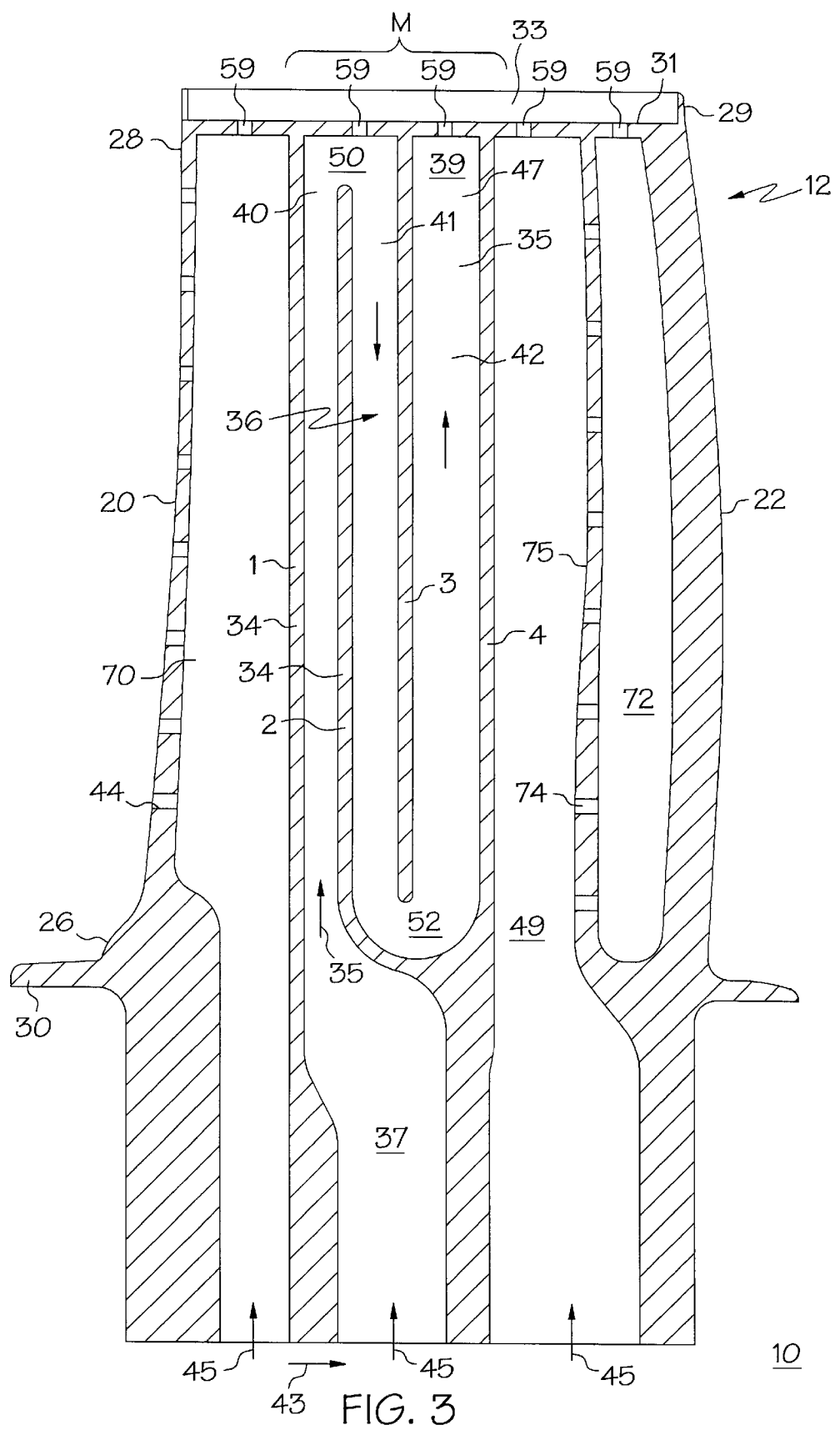
FIG. 3 is a sectional illustration of an exemplary gas turbine engine airfoil laid out flat along a mid-line through a downstream flowing serpentine cooling circuit therein.

More specifically referring to FIG. 2, the pressure and suction side walls 16 and 18, respectively, are spaced circumferentially or laterally apart from each other between the leading and trailing edges 20 and 22, and are integrally joined together by a plurality of internal transverse ribs indicated generally at 34 which extend between the pressure and suction side walls 16 and 18, respectively. First, second, third, and fourth ribs 1–4, respectively, of the transverse ribs 34 define a single aft flowing three pass serpentine cooling circuit 36 as illustrated in FIG. 3. FIG. 3 illustrates the airfoil 12 laid out flat along a cooling circuit split-line 38 in FIG. 2 that passes through the downstream or aft flowing serpentine cooling circuit 36. The serpentine cooling circuit 36 is constructed so as to use cooling air flow 45 delivered at the root 14 and direct a serpentine cooling flow 35 within the cooling circuit 36 to flow in a chordal flow direction 43 aftwards from the leading edge 20 to the trailing edge 22 within the cooling circuit 36. The cooling circuit 36 includes an entrance 37 positioned forward of a terminal end 39 to cause the serpentine cooling flow 35 to flow in the chordal flow direction 43 aftwards from the leading edge 20 to the trailing edge 22. This is to better match the applied heat loads from the combustion gases 32 and to more effectively tailor the serpentine cooling flows 35 to the heat loading of the airfoil 12 and more effectively cool the airfoil.

The serpentine cooling circuit 36 is referred to as a three pass circuit because it has three radially extending serpentine channels denoted as first, second, and third serpentine cooling channels 40, 41, and 42. The first, second, and third cooling channels 40, 41, and 42 separated by the chordally spaced apart internal ribs 34 denoted as the first through fourth ribs 1–4, respectively, in FIG. 3 and bounded on their transverse sides 47 by the pressure side and suction walls 16 and 18. The serpentine cooling circuit 36 is disposed near the mid-chord region M (also shown generally in FIG. 1) of the airfoil 12 between the leading edge 20 and the trailing edge 22 since experience has shown that the highest heat input in the airfoil 12 is in the mid-chord region near the airfoil tip 28 and on the pressure side wall 16 for example.

The first channel 40 of the serpentine cooling circuit 36 extends radially through the base 26 and the root 14 to radially upwardly to a radially outer first turning channel 50. The first turning channel 50 turns the cooling air radially inwardly into the second cooling channel 41 which directs cooling air radially inward to a radially inner second turning channel 52 which in turn directs the cooling air radially upwardly into the last or the third cooling channel 42. The third cooling channel 42 and the serpentine cooling circuit 36 terminate at the outer tip wall 31 where one or more of the tip cooling holes 59 may be used to vent the serpentine cooling circuit 36. The airfoil squealer tip is cooled by the tip cooling hole 59 in the outer tip wall 31. The placement of the tip cooling holes 59 in radially outer ends of one or more of the first, second, and/or third cooling channels 40, 41, and 42 permits better control and metering of cooling air to the squealer type airfoil tip 28.

A straight through single pass leading edge cooling channel 70 is located between a forward one of the internal transverse ribs 34, the first rib 1, and the leading edge 20 and the outer wall 15. The cooling air flow 45, delivered at the root 14, is flowed through the leading edge cooling channel 70 and provides cooling of the leading edge 20 and the outer wall 15 around bordering the leading edge cooling. The cooling air flow 45 that is flowed through the leading edge cooling channel 70 and is exhausted from the channel through the tip cooling holes 59 extending through the outer tip wall 31 and leading edge gill holes 44 that extend out from the leading edge cooling channel through the pressure side wall 16 of the outer wall 15. The leading edge 20 is cooled by convection.

A straight through single pass trailing edge feed channel 49 is located between an aftwardmost one of the internal transverse ribs 34 denoted as span rib 75 and the fourth rib 4. A trailing edge cooling plenum 72 is located between an aftwardmost one of the internal transverse ribs 34, denoted as an aftwardmost span rib 75, and the trailing edge 22 of the outer wall 15. Cooling air impingement or discharge apertures 74 in the aftwardmost span rib 75 feed cooling air from the trailing edge feed channel 49 to the trailing edge cooling plenum 72 from where it is flowed through film cooling holes 48 near the trailing edge 22 along the pressure side wall 16 of the outer wall 15 and through the tip cooling hole 59 in the outer tip wall 31. In the exemplary embodiment illustrated herein, the cooling air discharge apertures 74 are designed to provide impingement cooling of the trailing edge 22. These two arrangements are used to cool the leading and trailing edges 20 and 22, respectively. The leading edge cooling channel 70 and the trailing edge feed channel 49 extend radially through the base 26 and the root 14.

Illustrated in FIG. 3 is a cross-section of the exemplary airfoil illustrated herein. Only the last one of the serpentine cooling channels, the third serpentine cooling channel 42, has film cooling holes 48. The film cooling holes 48 are disposed through the outer wall 15 and only along the pressure side wall 16 of the outer wall 15 from and third serpentine cooling channel 42. The film cooling holes 48 are compound angled downstream and radially outward with respect to the engine centerline 11 and leading out from the third serpentine cooling channel 42 and the cooling plenum 72 through the outer wall 15. Other embodiments may include film cooling holes along both the pressure and suction side walls 16 and 18, respectively, of the outer wall 15.

The invention provides efficient cooling of the turbine blade with a minimum number of turning channels and small holes used for impingement cooling both of which cause resistance to airflow and therefore require higher pressure cooling air to be used. They also cause higher flow losses for which is also costly in terms of cooling air and fuel consumption. Flowing the serpentine cooling flow 35 in aft or a downstream direction relatively very cool cooling air in the serpentine cooling circuit 36 may be used along the more upstream and hotter portions of the pressure side wall 16, thus, maximizing cooling efficiency of the airfoil. This in turn allows the amount of cooling air flow 45 used for the serpentine cooling flow 35 in the serpentine cooling circuit 36 to be reduced to only that which is needed for accommodating the heat input loads in that region. In this way, the airfoil 12 may be cooled in the axial or chordal directions of the airfoil using less total cooling air flow 45 where permitted without overcooling those regions as would occur in the prior art. The cooling air flow 45 is therefore used more efficiently and less cooling air is bled from the compressor for increasing the overall efficiency of operation of the gas turbine engine.

The airfoil 12 may have any other conventional features for enhancing the cooling thereof such as turbulators or pins (not shown) which are well known in the art. Thermal barrier coatings TBC, well known in the technology, may also be used to improve thermal characteristics of the airfoil 12.

Although the invention has been described with respect to the exemplary turbine blade 10 illustrated in the FIGS., it may also be used for turbine nozzle vanes which have similar airfoils which can benefit from preferential spanwise cooling thereof for better matching the radial applied temperature distribution from the combustion gases 32. The aft flowing serpentine cooling circuit 36 may be readily manufactured using conventional casting techniques as are used for conventional multi-pass serpentine passages.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims:

1. A gas turbine engine airfoil comprising:

an airfoil outer wall having width wise spaced apart pressure and suction side walls joined together at chordally spaced apart leading and trailing edges of said airfoil and extending radially from a radially inner base to a radially outer airfoil tip, a plurality of radially extending internal ribs extending width wise between said pressure and suction side walls;

an internal single three pass serpentine cooling circuit having radially extending first, second, and third serpentine channels between, in axially aft succession, first, second, third, and fourth ribs of said radially extending internal ribs;

said first, second, and third serpentine channels bounded by said first, second, third, and fourth ribs of said plurality of radially extending internal ribs and said pressure and suction side walls;

said serpentine cooling circuit including an entrance and a terminal end at an outer tip wall of the airfoil wherein said terminal end is positioned aft of said entrance and includes at least one tip cooling holes extending through said outer tip wall from said terminal end so as to have a chordal flow direction aftwards from said leading edge to said trailing edge within said serpentine circuit;

a straight through single pass leading edge cooling channel located between said first rib, said leading edge, and said outer wall; and said first serpentine channel and said leading edge cooling channel extending radially through said the base.

2. A gas turbine engine airfoil comprising:

an airfoil outer wall having width wise spaced apart pressure and suction side walls joined together at chordally spaced apart leading and trailing edges of said airfoil and extending radially from a radially inner base to a radially outer airfoil tip, a plurality of radially extending internal ribs extending width wise between said pressure and suction side walls;

an internal single three pass serpentine cooling circuit having radially extending first, second, and third serpentine channels between, in axially aft succession, first, second, third, and fourth ribs of said radially extending internal ribs;

said first, second, and third serpentine channels bounded by said first, second, third, and fourth ribs of said plurality of radially extending internal ribs and said pressure and suction side walls;

said serpentine cooling circuit including an entrance and a terminal end wherein said terminal end is positioned aft of said entrance so as to have a chordal flow direction aftwards from said leading edge to said trailing edge within said serpentine circuit;

a straight through single pass leading edge cooling channel located between said first rib, said leading edge, and said outer wall;

said first serpentine channel and said leading edge cooling channel extending radially through said the base;

a trailing edge cooling plenum located between an aftwardmost one of said plurality of internal transverse ribs and said trailing edge, and said pressure and suction side walls;

a straight through single pass trailing edge feed channel located between said aftwardmost one of said internal transverse ribs and said fourth rib and extending radially through said base; and cooling air discharge apertures disposed in said aftwardmost one of said plurality of internal transverse ribs, said discharge apertures disposed between said trailing edge feed channel and said trailing edge cooling plenum.

3. An airfoil as claimed in claim 2 further comprising a plurality of leading edge cooling apertures extending out from said leading edge cooling channel through said outer wall and a plurality of trailing edge cooling apertures extending out of said trailing edge cooling plenum through said outer wall at said trailing edge.

4. An airfoil as claimed in claim 3 wherein said leading edge cooling apertures are gill holes and said trailing edge cooling apertures are trailing edge film cooling holes.

5. An airfoil as claimed in claim 4 further comprising a squealer tip having a squealer wall extending radially outward from and peripherally around a radially outer tip wall forming a squealer tip cavity therein.

6. An airfoil as claimed in claim 5 further comprising at least one tip cooling hole extending out from at least one of said impingement chambers through said radially outer tip wall of said tip.

7. An airfoil as claimed in claim 2 further comprising a first plurality of side wall film cooling holes leading from at least one of said first, second, and third serpentine channels.

8. An airfoil as claimed in claim 1 further comprising:

a trailing edge cooling plenum located between an aftwardmost one of said plurality of internal transverse ribs and said trailing edge, and said pressure and suction side walls;

a straight through single pass trailing edge feed channel located between said aftwardmost one of said internal transverse ribs and said fourth rib and extending radially through said base, cooling air discharge apertures disposed in said aftwardmost one of said plurality of internal transverse ribs, said discharge apertures disposed between said trailing edge feed channel and said trailing edge cooling plenum.

9. An airfoil as claimed in claim 8 further comprising a plurality of leading edge cooling apertures extending out from said leading edge cooling channel through said outer wall and a plurality of trailing edge cooling apertures extending out of said trailing edge cooling plenum through said outer wall at said trailing edge.

10. An airfoil as claimed in claim 9 wherein said leading edge cooling apertures are gill holes and said trailing edge cooling apertures are trailing edge film cooling holes.

11. An airfoil as claimed in claim 10 further comprising a squealer tip having a squealer wall extending radially outward from and peripherally around a radially outer tip wall forming a squealer tip cavity therein.

12. An airfoil as claimed in claim 11 further comprising at least one tip cooling hole extending out from at least one of said impingement chambers through said radially outer tip wall of said tip.

13. An airfoil as claimed in claim 12 further comprising a first plurality of side wall film cooling holes leading from at least one of said first, second, and third serpentine channels.

14. A gas turbine engine blade comprising:

a hollow airfoil extending radially outwardly from a root;

said airfoil comprising;

an airfoil outer wall having width wise spaced apart pressure and suction side walls joined together at chordally spaced apart leading and trailing edges of said airfoil and extending radially from a radially inner base to a radially outer airfoil tip, a plurality of radially extending internal ribs extending width wise between said pressure and suction side walls;

an internal single three pass serpentine cooling circuit having radially extending first, second, and third serpentine channels between, in axially aft succession, first, second, third, and fourth ribs of said radially extending internal ribs;

said first, second, and third serpentine channels bounded by said first, second, third, and fourth ribs of said plurality of radially extending internal ribs and said pressure and suction side walls;

said serpentine cooling circuit including an entrance and a terminal end at an outer tip wall of the airfoil wherein said terminal end is positioned aft of said entrance and includes at least one tip cooling holes extending through said outer tip wall from said terminal end so as to have a chordal flow direction aftwards from said leading edge to said trailing edge within said serpentine circuit;

a straight through single pass leading edge cooling channel located between said first rib, said leading edge, and said outer wall; and said first serpentine channel and said leading edge cooling channel extending radially through said base and root.

15. A gas turbine engine blade comprising:

a hollow airfoil extending radially outwardly from a root;

said airfoil comprising;

an airfoil outer wall having width wise spaced apart pressure and suction side walls joined together at chordally spaced apart leading and trailing edges of said airfoil and extending radially from a radially inner base to a radially outer airfoil tip, a plurality of radially extending internal ribs extending width wise between said pressure and suction side walls;

an internal single three pass serpentine cooling circuit having radially extending first, second, and third serpentine channels between, in axially aft succession, first, second, third, and fourth ribs of said radially extending internal ribs;

said first, second, and third serpentine channels bounded by said first, second, third, and fourth ribs of said plurality of radially extending internal ribs and said pressure and suction side walls;

said serpentine cooling circuit including an entrance and a terminal end wherein said terminal end is positioned aft of said entrance so as to have a chordal flow direction aftwards from said leading edge to said trailing edge within said serpentine circuit;

a straight through single pass leading edge cooling channel located between said first rib, said leading edge, and said outer wall;

said first serpentine channel and said leading edge cooling channel extending radially through said base and root;

a trailing edge cooling plenum located between an aftwardmost one of said plurality of internal transverse ribs and said trailing edge, and said pressure and suction side walls;

a straight through single pass trailing edge feed channel located between said aftwardmost one of said internal transverse ribs and said fourth rib and extending radially through said base and said root; and cooling air discharge apertures disposed in said aftwardmost one of said plurality of internal transverse ribs, said discharge apertures disposed between said trailing edge feed channel and said trailing edge cooling plenum.

16. A blade as claimed in claim 15 further comprising a plurality of leading edge cooling apertures extending out from said leading edge cooling channel through said outer wall and a plurality of trailing edge cooling apertures extending out of said trailing edge cooling plenum through said outer wall at said trailing edge.

17. A blade as claimed in claim 16 wherein said leading edge cooling apertures are gill holes and said trailing edge cooling apertures are trailing edge film cooling holes.

18. A blade as claimed in claim 17 further comprising a squealer tip having a squealer wall extending radially outward from and peripherally around said outer tip wall forming a squealer tip cavity therein.

19. A blade as claimed in claim 18 further comprising at least one tip cooling hole extending through a radially outer tip wall of said tip.

20. A blade as claimed in claim 15 further comprising a first plurality of side wall film cooling holes leading from at least one of said first, second, and third serpentine channels.

21. A blade as claimed in claim 14 further comprising:

a trailing edge cooling plenum located between an aftwardmost one of said plurality of internal transverse ribs and said trailing edge, and said pressure and suction side walls;

a straight through single pass trailing edge feed channel located between said aftwardmost one of said internal transverse ribs and said fourth rib and extending radially through said base, cooling air discharge apertures disposed in said aftwardmost one of said plurality of internal transverse ribs, said discharge apertures disposed between said trailing edge feed channel and said trailing edge cooling plenum.

22. A blade as claimed in claim 21 further comprising a plurality of leading edge cooling apertures extending out from said leading edge cooling channel through said outer wall and a plurality of trailing edge cooling apertures extending out of said trailing edge cooling plenum through said outer wall at said trailing edge.

23. A blade as claimed in claim 22 wherein said leading edge cooling apertures are gill holes and said trailing edge cooling apertures are trailing edge film cooling holes.

24. A blade as claimed in claim 23 further comprising a squealer tip having a squealer wall extending radially outward from and peripherally around a radially outer tip wall forming a squealer tip cavity therein.

25. A blade as claimed in claim 24 further comprising at least one tip cooling hole extending out from at least one of said impingement chambers through said radially outer tip wall of said tip.

26. A blade as claimed in claim 25 further comprising a first plurality of side wall film cooling holes leading from at least one of said first, second, and third serpentine channels.

\* \* \* \* \*